United States Patent
Jones

(10) Patent No.: US 7,893,588 B1
(45) Date of Patent: Feb. 22, 2011

(54) MAGNETIC ELECTRON EXCITER AND METHODS

(75) Inventor: Johnnie L. Jones, Pierson, MI (US)

(73) Assignee: Galaxy, LLC, Rockford, MI (US)

( * ) Notice: Subject to any disclaimer, the term of this patent is extended or adjusted under 35 U.S.C. 154(b) by 248 days.

(21) Appl. No.: 12/070,416

(22) Filed: Feb. 19, 2008

Related U.S. Application Data

(60) Provisional application No. 60/902,727, filed on Feb. 22, 2007.

(51) Int. Cl.
*H02P 9/40* (2006.01)
*H05B 7/144* (2006.01)
*H02K 1/12* (2006.01)
*H02K 21/24* (2006.01)

(52) U.S. Cl. ............. 310/191; 310/156.35; 310/156.43; 322/52; 373/104

(58) Field of Classification Search .............. 373/60, 373/102, 104; 322/52, 49, 50; 310/156.35, 310/191
See application file for complete search history.

(56) References Cited

U.S. PATENT DOCUMENTS

| | | | |
|---|---|---|---|
| 2,026,474 A * | 12/1935 | Kranz | 290/4 A |
| 2,784,332 A * | 3/1957 | Kober | 310/191 |
| 2,824,275 A * | 2/1958 | Kober | 322/27 |
| 3,233,133 A * | 2/1966 | Kober | 310/191 |
| 3,952,138 A * | 4/1976 | Nanjyo et al. | 373/104 |
| 4,931,702 A * | 6/1990 | Voronin et al. | 315/344 |
| 4,959,578 A * | 9/1990 | Varga | 310/268 |
| 6,023,135 A * | 2/2000 | Gilbreth et al. | 318/140 |
| 6,037,696 A * | 3/2000 | Sromin et al. | 310/268 |
| 6,249,069 B1 * | 6/2001 | Krueger | 310/74 |
| 7,309,938 B1 * | 12/2007 | Smith | 310/113 |
| 7,382,074 B2 * | 6/2008 | Ashodia | 310/190 |
| 2005/0140231 A1 * | 6/2005 | Ogoshi | 310/113 |
| 2007/0013251 A1 * | 1/2007 | Djuric | 310/113 |

FOREIGN PATENT DOCUMENTS

JP 2002-247822 * 8/2002

* cited by examiner

*Primary Examiner*—Burton Mullins
(74) *Attorney, Agent, or Firm*—Price, Heneveld, Cooper, DeWitt & Litton, LLP

(57) ABSTRACT

A magnetic electron exciter includes a rotor adapted to be rotated within a preselected range of rotational speeds, and having a plurality of magnets mounted therein preselected distances from the rotational axis of the rotor. A plurality of coils are positioned adjacent to the rotor, whereby rotation of the rotor creates an electrical current in the coils. First and second electrodes are spaced apart a predetermined distance, and are electrically connected with the coils to create an arc between the electrodes when the rotor is rotated relative to the coils.

5 Claims, 6 Drawing Sheets

US 7,893,588 B1

MAGNETIC ELECTRON EXCITER AND METHODS

CLAIM OF PRIORITY

Applicant hereby claims the priority benefits under the provisions of 35 U.S.C. §119, basing said claim of priority on related U.S. Provisional Patent Application Ser. No. 60/902,727, filed Feb. 22, 2007, entitled MAGNETIC ELECTRON EXCITER AND METHODS, which is hereby incorporated herein by reference.

BACKGROUND OF THE INVENTION

The present invention relates generally to electrical generators, and in particular to a magnetic electron exciter and associated processes using the same.

SUMMARY OF THE INVENTION

One aspect of the present invention is to provide a magnetic electron exciter having a rotor adapted to be rotated within a preselected range of rotational speeds, and a plurality of magnets mounted in the rotor preselected distances from the rotational axis of the rotor. A plurality of coils are disposed adjacent to the rotor, whereby rotation of the rotor creates an electrical current in the coils. First and second electrodes are spaced apart a predetermined distance, and are electrically connected with the coils to create an arc between the electrodes when the rotor is rotated relative to the coils.

Yet another aspect of the present invention is a method for processing materials, comprising forming a rotor adapted to be rotated within a preselected range of rotational speeds, and mounting a plurality of magnets in the rotor at selected distances from the rotational axis of the rotor. The method further includes mounting a plurality of coils adjacent to the rotor, whereby rotation of the rotor creates an electrical current in the coils. The method further includes positioning first and second electrodes a spaced apart distance and electrically connecting the same with the coils. Finally, the method includes rotating the rotor relative to the coils to create an arc between the electrodes when the same is rotated relative to the coils, and positioning a material adjacent to or within the arc to process the same.

These and other advantages of the invention will be further understood and appreciated by those skilled in the art by reference to the following written specification, claims and appended drawings.

DETAILED DESCRIPTION OF THE PREFERRED EMBODIMENTS

Figure 1:
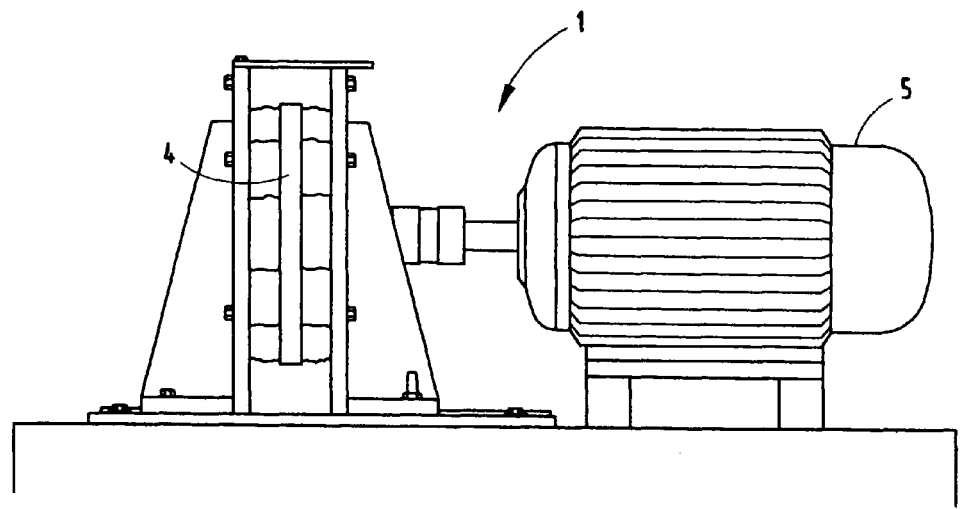
FIG. 1 is a perspective view of a magnetic electron exciter embodying the present invention.

For purposes of description herein, the term "upper", "lower", "right", "left", "rear", "front", "vertical", "horizontal" and derivatives thereof shall relate to the invention as shown in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts set forth herein. Hence, specific dimensions and other physical characteristics relating to the embodiments disclosed herein are not to be considered as limiting.

The reference numeral 1 generally designates a magnetic electron exciter (MEE) embodying the present invention. MEE 1 is a device that uses permanent magnets 2 and electromagnetic coils 3. The permanent magnets 2 are fitted in a rotor 4 with north and south poles positioned in such a way as to cause them to come over the coils 3 on each side as the rotor 4 is turned by a motor 5 at various RPMs. As this is done, the faster the motor 5 turns the rotor 4, the more the permanent magnets 2 excite the electromagnetic coils 3, the more electrons are excited, and thus more energy is produced.

The electromagnetic coils (EMC) 3 are wired in either parallel or series with one another. The output of the coils 3 is wired through capacitors 6 that are connected in either series or parallel. The capacitors 6 tune the output of the electromagnetic coils 3 (inductance) depending on the desired results and smooth out the arc that is produced between two electrodes 7. The electrodes 7 are made of various materials, preferably carbon and graphite. Also, electrodes 7 may comprise tungsten electrodes of the type used in heliarc welding processes.

Figure 8:
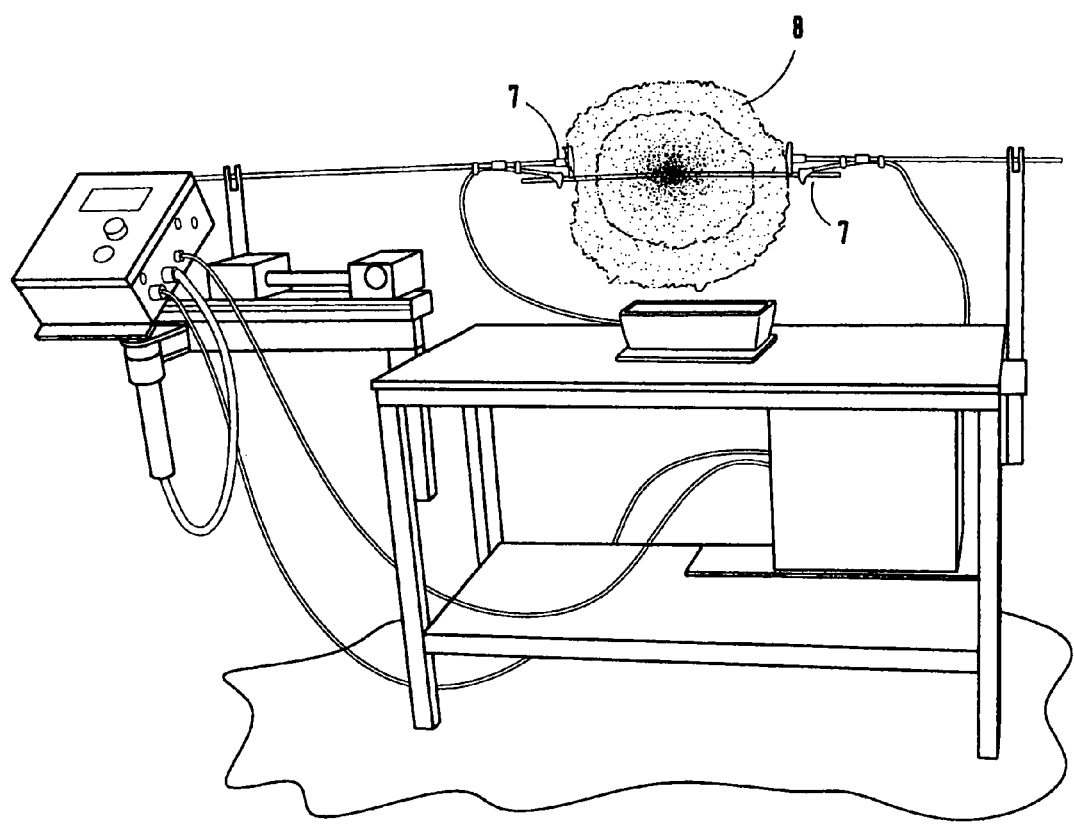
FIG. 8 is a perspective view of the magnetic electron exciter showing a white light formed between opposite electrodes.

As best illustrated in FIG. 8, the arc 8 in open air produces an incandescent white light by burning the nitrogen and oxygen in the air. In a vacuum, the arc 8 would be invisible. The arc 8 has little heat due to there being a small amount of voltage (up to 200V), a small current (up to 10 A) and a low frequency (up to 1 KHz). However, when material is introduced into the arc 8, the material can become thousands of degrees and densify or melt the material or just heat it up to a desired temperature, like annealing, in seconds with very low energy input and very high output.

The present MEE 1 uses twenty-four EMCs 3, twelve on each side of the rotor 4. The EMCs 3 may be connected in series or in parallel with one another. It is to be understood that more or fewer EMCs 3 can be used for different applications. The illustrated rotor 4 contains twenty-four permanent magnets 2. Each magnet 2 is positioned so that it is opposite in polarity from the magnet 2 next to it. The magnets 2 can vary in power, more or less lines of flux, and other similar characteristics and types.

The coils 3 are wound to fit laminates 9. The laminates 9 are layered to prevent magnetic eddy currents that produce heat. The laminates 9 (stator) are in a circle with twenty-four risers 10. Every other riser 10 has a coil 3 on it, and the other twelve are blank. The blank risers 10 act as a magnetic return. The twelve risers 10 with the coils 3 are called the acceptors. This makes the magnetic forces swirl around or excite one another. As the rotor 4, with the north and south magnets, passes by the coils 3, each coil 3, one on each side of the rotor 4, gets excited and influences the other ELCs 3 wired in series. Both sides are wired in parallel or series depending on the desired results.

Coils 3 can be wound with large or small wire. The larger the wire, the less voltage and the less power. The smaller the wire, the more voltage, current and the more power. This can be done for different results. The coils 3 can be wound physically larger or smaller to achieve less or more power. All of these factors can be varied.

The low voltage and low current that excite the electrons in machine 1 have a greater energy range than a machine that produces the same electrons, such as a carbon arc furnace or an induction oven that takes 700 A or more at 2,300 degrees Celsius.

Figure 2:
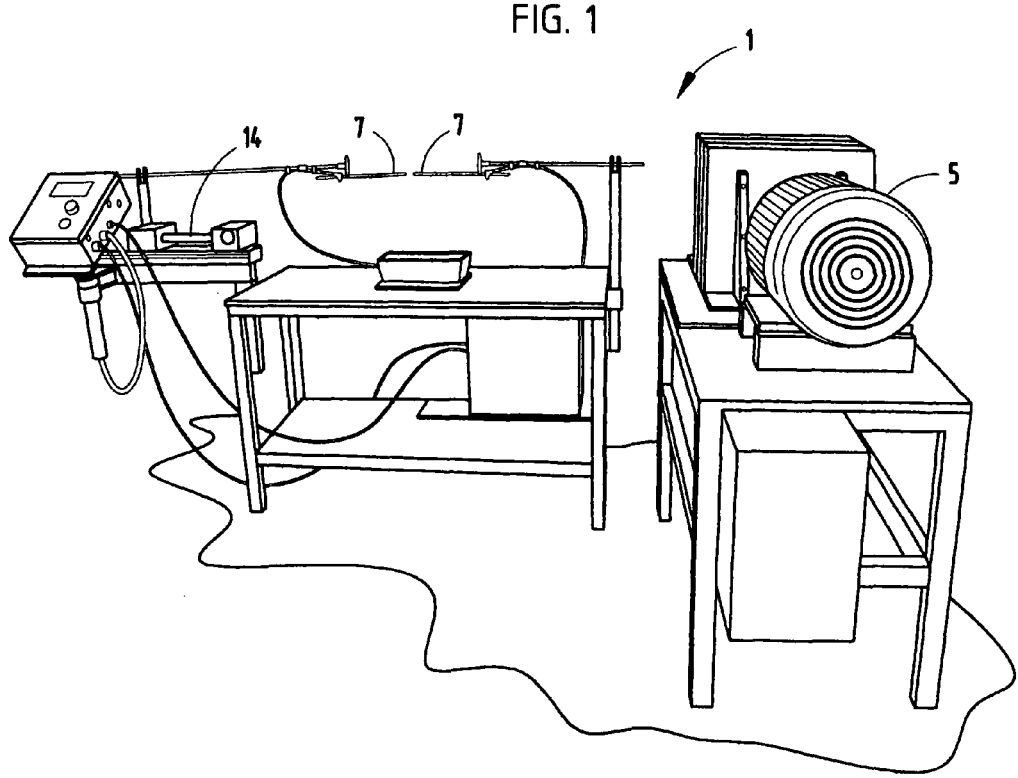
FIG. 2 is another perspective view of the magnetic electron exciter.
Figure 3A:
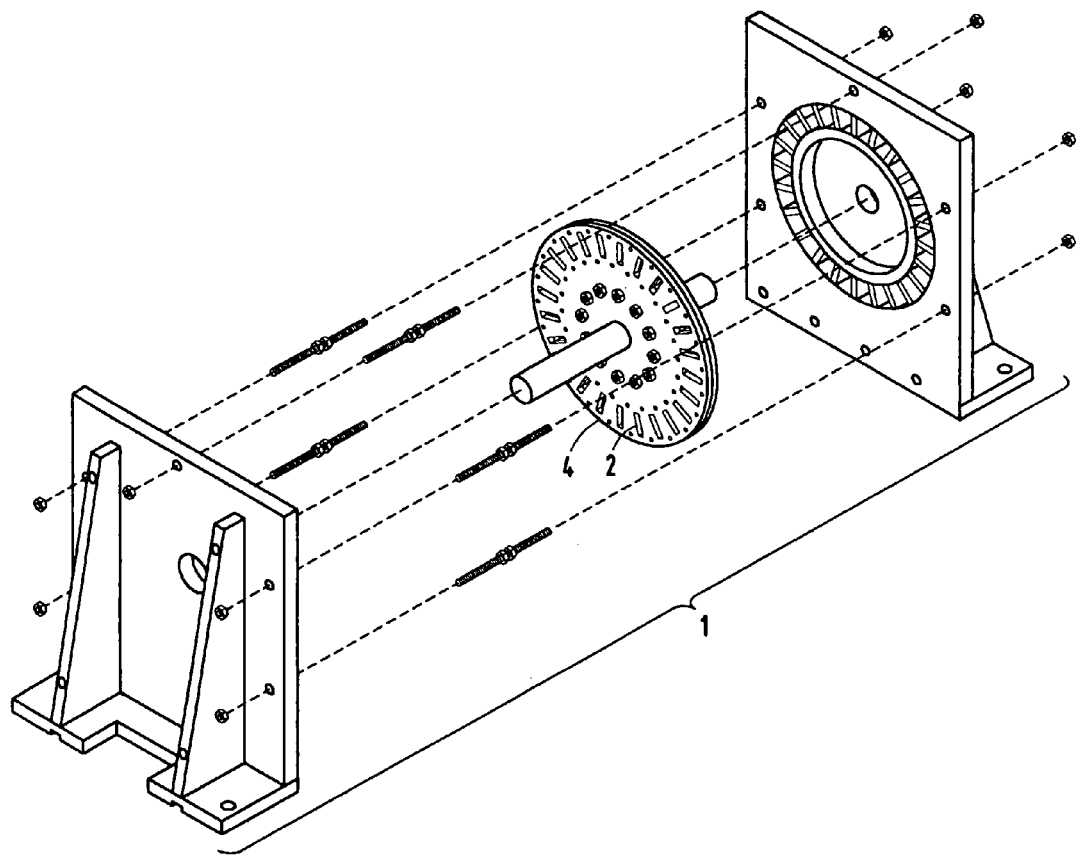
FIG. 3A is an exploded perspective view of a portion of the magnetic electron exciter.
Figure 3B:
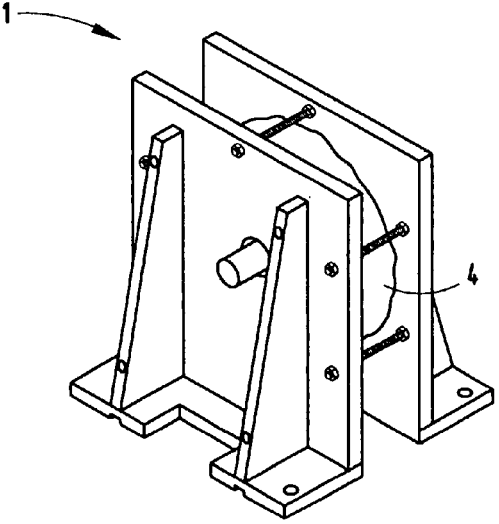
FIG. 3B is a perspective view of a portion of the magnetic electron exciter.
Figure 4:
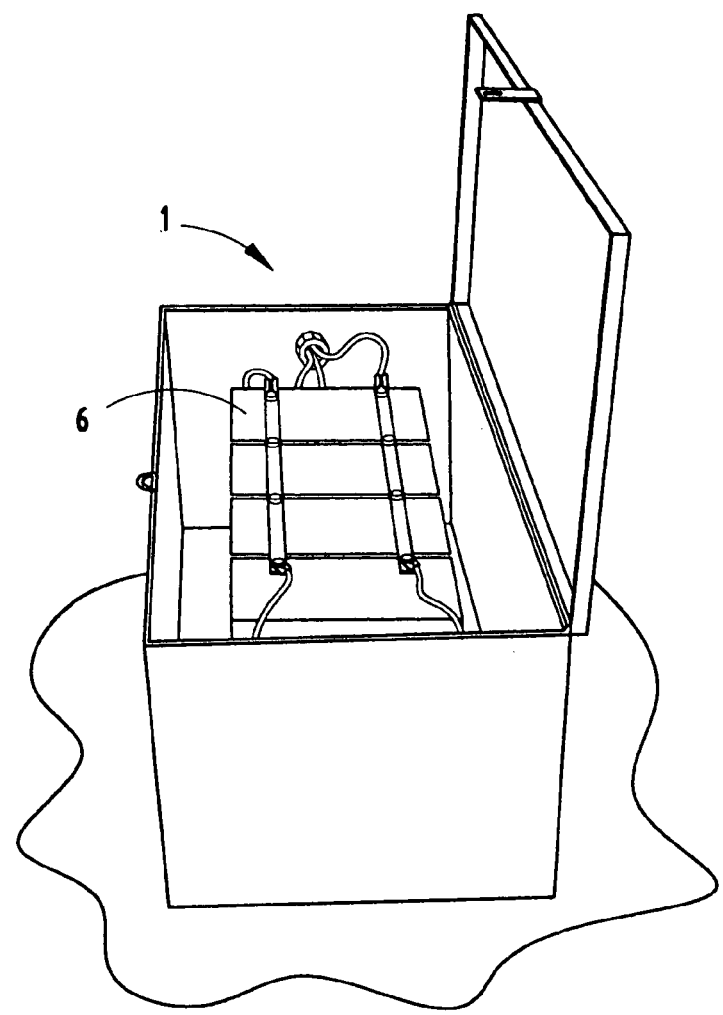
FIG. 4 is a perspective view of a condenser portion of the magnetic electron exciter.
Figure 5:
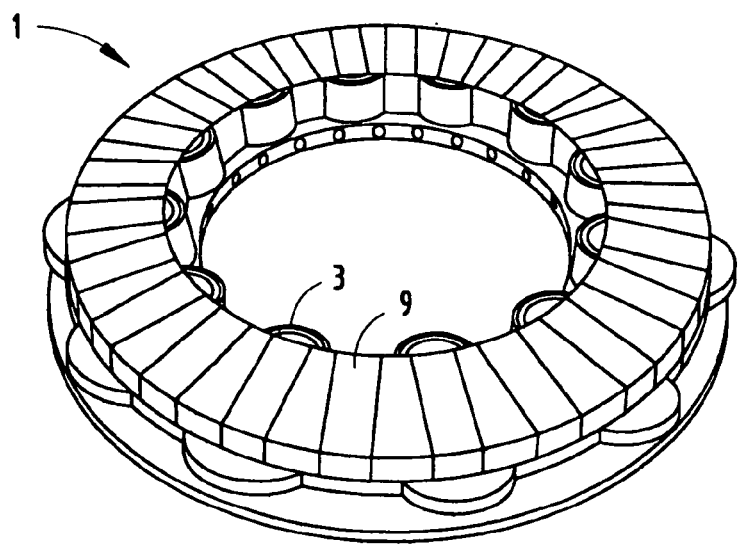
FIG. 5 is a perspective view of a rotor portion and a coil portion of the magnetic electron exciter.
Figure 6A:
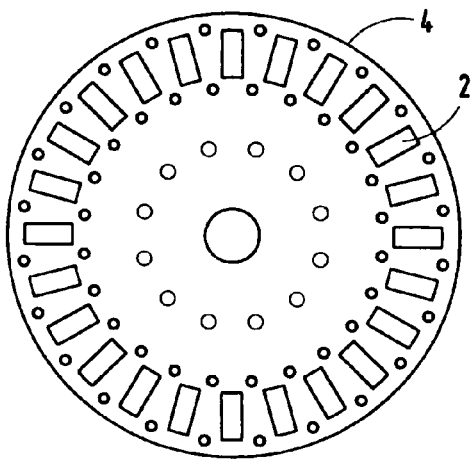
FIG. 6A is a plan view of the rotor.
Figure 6B:
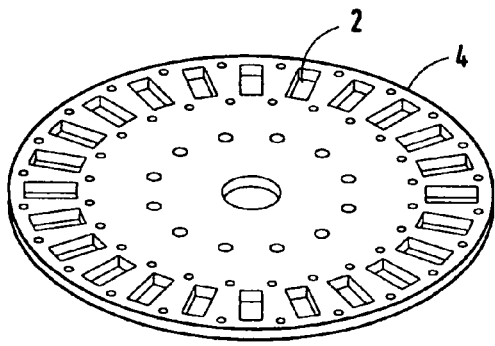
FIG. 6B is a perspective view of the rotor.
Figure 7A:
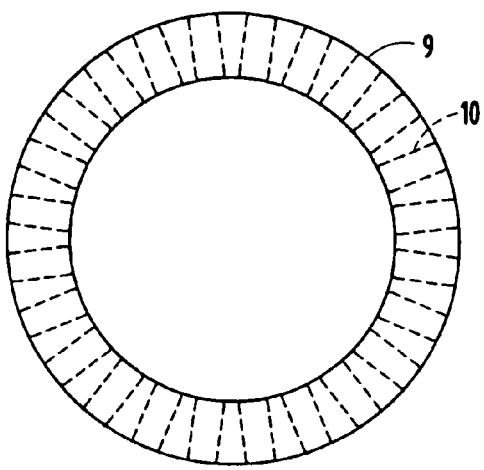
FIG. 7A is a plan view of a laminate portion of the magnetic electron exciter.
Figure 7B:
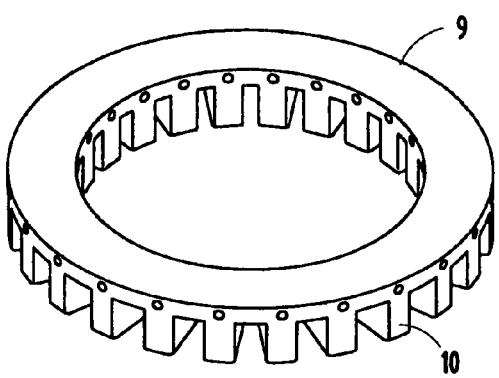
FIG. 7B is a perspective view of the laminate.
Figure 7C:
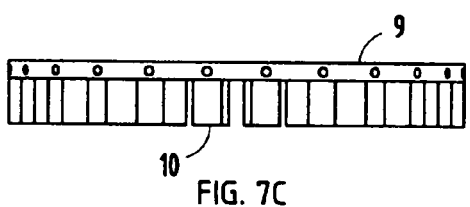
FIGS. 7C and 7D are side elevational views of the laminate.
Figure 7D:
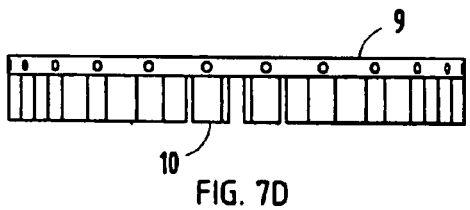

In the embodiment illustrated in FIG. 2, the right-hand electrode 7 is fixed relative to the worksurface, and the left-hand electrode 7 is mounted for horizontal reciprocation on a mechanical drive 14 which accurately shifts electrodes 7 toward and away from each other in a horizontally aligned relationship. Alternatively, the electrodes 7 can be arranged in an angular relationship, such as a 30-60 degree included angle.

Magnetic electron exciter 1 is adapted to be used in conjunction with a wide variety of manufacturing processes and methods. In one working example of the present invention, mineral ore is positioned within the arc, which is adjusted to a predetermined intensity, so as to extract metallic components from the same. Other examples of processes incorporating the magnetic electron exciter 1 include melting or smelting precious metals. Magnetic electron exciter 1 purifies gold that is only 70 percent to 80 percent to 98 percent pure. Magnetic electron exciter 1 seems to vaporize impurities. Magnetic electron exciter 1 melts and breaks down tailings of iron rock that cannot be melted, crushed, or drilled at present. Magnetic electron exciter 1 melts and purifies prill that has been extracted from ore. Other applications of magnetic electron exciter 1 will be apparent to those skilled in the art.

Figure 9:
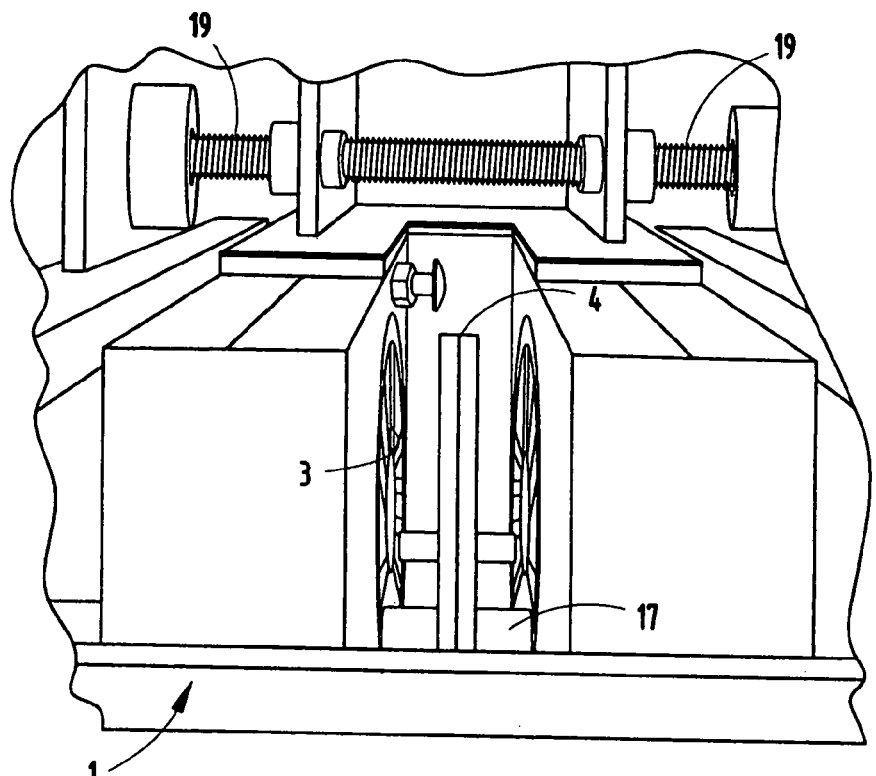
FIGS. 9 and 10 are perspective views of another embodiment of the magnetic electron exciter.
Figure 10:
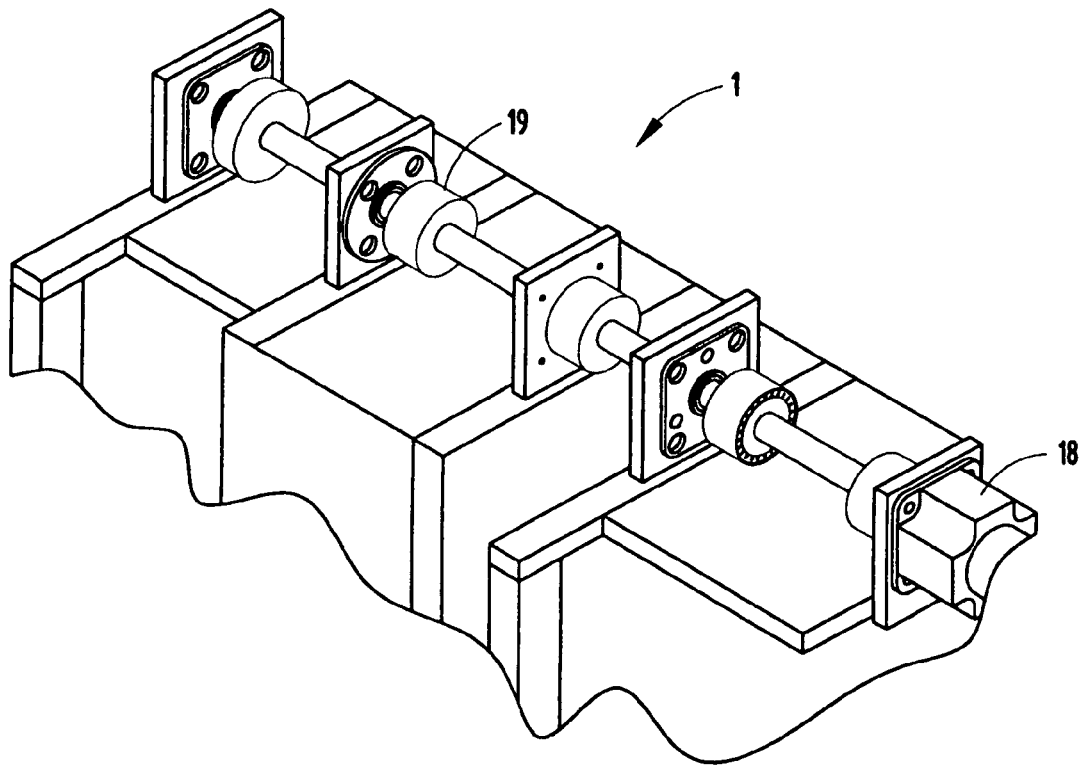

In the embodiment illustrated in FIGS. 8 and 9, laminates 9 are mounted on laterally adjustable supports or ways 17 which permit the laminates 9 to be converged and diverged relative to rotor 4 by actuating motor 18 and screws 19, so as to facilitate adjusting the characteristics of the magnetic field applied to electrodes 7.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A magnetic electron exciter, comprising:

a rotor adapted to be rotated within a preselected range of rotational speeds;

a plurality of magnets mounted in said rotor preselected distances from the rotational axis of said rotor;

first and second coil support members disposed on opposite sides of said rotor and being movably supported to axially converge and diverge relative to the opposite sides of said rotor;

a plurality of first coils mounted in said first coil support member, and a plurality of second coils mounted in said second coil support member, whereby rotation of said rotor relative to said first and second coils creates an electrical current in said first and second coils;

first and second electrodes spaced apart a predetermined distance and electrically connected with said first and second coils to create an arc between said electrodes when said rotor is rotated relative to said first and second coils;

a screw threadedly connected with said first and second coil support members, such that rotation of said screw simultaneously converges and diverges said first and second coils in an axial direction relative to the opposite sides of said rotor to vary the characteristics of said arc created between said electrodes; and a rotary motor operably connected with said screw, and rotating said screw in opposite directions to automatically converge and diverse said first and second coils relative to the opposite sides of said rotor.

2. A magnetic electron exciter as set forth in claim 1, wherein:

each of said first and second coil support members comprise a layered laminate to prevent the formation of magnetic eddy currents that produce heat.

3. A magnetic electron exciter as set forth in claim 2, wherein:

each of said first and second coil support members include a plurality of risers arranged in a circular pattern which separate adjacent ones of said first and second coils and cause the magnetic flux to swirl around said first and second coils.

4. A magnetic electron exciter as set forth in claim 3, wherein:

said magnets can be of various powers and fluxes to accommodate different applications.

5. A magnetic electron exciter as set forth in claim 3, wherein:

each of said magnets is positioned in said rotor such that the polarity of the same is oriented opposite to the polarity of the next adjacent one of said magnets.

* * * * *

UNITED STATES PATENT AND TRADEMARK OFFICE
CERTIFICATE OF CORRECTION

| | | |
|---|---|---|
| PATENT NO. | : 7,893,588 B1 | Page 1 of 1 |
| APPLICATION NO. | : 12/070416 | |
| DATED | : February 22, 2011 | |
| INVENTOR(S) | : Jones | |

It is certified that error appears in the above-identified patent and that said Letters Patent is hereby corrected as shown below:

Column 4
Claim 1, line 29, "diverse" should be -- diverge --.
Claim 3, line 38, "include" should be -- includes --.

Signed and Sealed this
Fourth Day of October, 2011

David J. Kappos
*Director of the United States Patent and Trademark Office*